United States Patent
Jeon

(10) Patent No.: US 8,461,729 B2
(45) Date of Patent: Jun. 11, 2013

(54) LINEAR VIBRATOR

(75) Inventor: Young Jae Jeon, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 174 days.

(21) Appl. No.: 13/074,596

(22) Filed: Mar. 29, 2011

(65) Prior Publication Data

US 2011/0278960 A1 Nov. 17, 2011

(30) Foreign Application Priority Data

May 14, 2010 (KR) .......................... 10-2010-0045656

(51) Int. Cl.
*H02K 33/00* (2006.01)

(52) U.S. Cl.
USPC ............................... 310/25; 310/15

(58) Field of Classification Search
USPC ..................... 310/11, 15, 17, 25, 36
See application file for complete search history.

(56) References Cited

U.S. PATENT DOCUMENTS

| 4,295,011 | A | 10/1981 | Hathaway | |
|---|---|---|---|---|
| 6,753,630 | B1 | 6/2004 | Ueda et al. | |
| 8,134,259 | B2 * | 3/2012 | Choi | 310/25 |
| 2001/0013729 | A1 | 8/2001 | Hamaguchi et al. | |
| 2005/0285453 | A1 | 12/2005 | Oh et al. | |
| 2010/0259113 | A1 * | 10/2010 | Lee et al. | 310/23 |
| 2010/0277010 | A1 * | 11/2010 | Jeon | 310/25 |
| 2011/0133578 | A1 * | 6/2011 | Choi | 310/25 |
| 2011/0291497 | A1 * | 12/2011 | Choi | 310/25 |
| 2011/0309691 | A1 * | 12/2011 | Park et al. | 310/25 |

FOREIGN PATENT DOCUMENTS

| CN | 1227513 A | 9/1999 |
|---|---|---|
| CN | 1640558 A | 7/2005 |
| JP | 2009-166016 A | 7/2009 |

OTHER PUBLICATIONS

Office Action issued in Chinese Patent Application No. 201110113023.X dated Apr. 3, 2013.

* cited by examiner

*Primary Examiner* — Thanh Lam
(74) *Attorney, Agent, or Firm* — McDermott Will & Emery LLP

(57) ABSTRACT

There is provided a linear vibrator including: a housing having an internal space formed therein; a magnetic field unit including a yoke disposed in the internal space, a magnet mounted on a surface of the yoke, and a yoke plate formed on a surface opposite to a contact surface between the magnet and the yoke; a coil interacting with the magnetic field unit to allow the magnetic field unit to move linearly when power is applied thereto, and forming a movement space for the magnetic field unit; magnetic fluid provided in a clearance between the magnetic field unit and the coil and alleviating contact impact between the magnetic field unit and the coil; and a contact avoiding unit formed on at least one of the magnetic field unit and the coil and avoiding a contact between the magnetic field unit and the coil due to an external impact.

6 Claims, 3 Drawing Sheets

LINEAR VIBRATOR

CROSS-REFERENCE TO RELATED APPLICATIONS

This application claims the priority of Korean Patent Application No. 10-2010-0045656 filed on May 14, 2010, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator capable of alleviating external impacts applied to a vibrator and a stator.

2. Description of the Related Art

A linear vibrator, which is a component converting electrical energy into mechanical vibrations using the principle of generating electromagnetic force, is mounted in an electronic apparatus such as a mobile communications terminal, a portable game machine, or the like, to be used to silently notify a user of call reception by transferring vibrations thereto.

In accordance with the recent trend for compactness and slimness in mobile communications terminals, a compact, multi-functional linear vibrator has also been mounted therein.

A stator and a vibrator, vibrated due to electromagnetic interaction therebetween, are disposed within an internal space of the linear vibrator, according to the related art.

Since internal components forming the vibrator and the stator are disposed in the internal space at a high level of density, interference is caused between the internal components even in the case of small external impacts.

Interference between internal components may cause problems such as the generation of noise, damage, or the like.

Accordingly, there has been demand for research into a linear vibrator in which damage to internal components thereof due to external impacts may be alleviated, in spite of the internal components thereof being disposed at a high level of density.

SUMMARY OF THE INVENTION

An aspect of the present invention provides to a linear vibrator capable of avoiding interference in an inner diameter of a coil in spite of a magnetic field unit being vibrated due to external impacts.

According to an aspect of the present invention, there is provided a linear vibrator including: a housing having an internal space formed therein; a magnetic field unit including a yoke disposed in the internal space, a magnet mounted on a surface of the yoke, and a yoke plate formed on a surface opposite to a contact surface between the magnet and the yoke; a coil interacting with the magnetic field unit to allow the magnetic field unit to move linearly when power is applied thereto, and forming a movement space for the magnetic field unit; magnetic fluid provided in a clearance between the magnetic field unit and the coil and alleviating contact impact between the magnetic field unit and the coil; and a contact avoiding unit formed on at least one of the magnetic field unit and the coil and avoiding a contact between the magnetic field unit and the coil due to an external impact.

The contact avoiding unit may be formed by chamfering the yoke plate, and a length of the contact surface between the yoke plate and the magnet may be longer than that of a non-contact surface opposite to the contact surface.

The housing may include a cylindrical upper case of which a lower portion is open and a bracket closing the lower portion of the upper case and having a coil mounted thereon.

A movement space of the coil corresponding to a position of the yoke plate may be larger than a vibration space in which the coil is formed at a position corresponding to a lower portion of the yoke plate in a vibration stop state.

The yoke may include a flat part having the magnet mounted thereon, a mass body fixing part being bent from the flat part in a mounting direction of the magnet to fix a mass body, and a claw part being bent from the mass body fixing part to support a bottom of the mass body.

The housing may include a damper formed on a surface thereof, the damper preventing the magnetic field unit from contacting the housing due to vibration.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
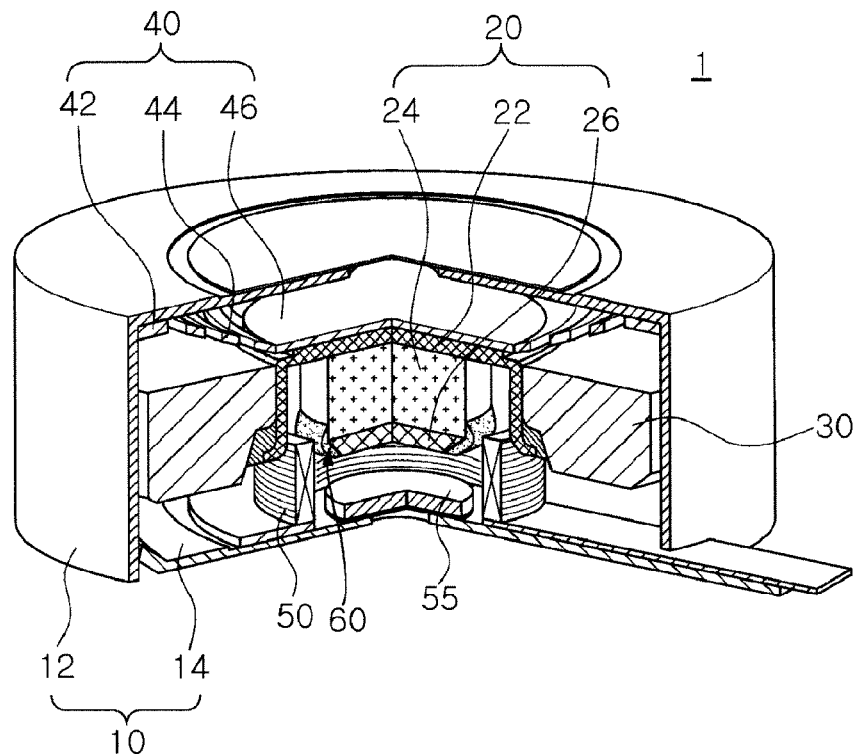
FIG. 1 is a partially cut-away perspective view schematically showing a linear vibrator according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, throughout the drawings, the same or like reference numerals will be used to designate the same or like components having the same functions within the scope of the similar idea.

Figure 2:
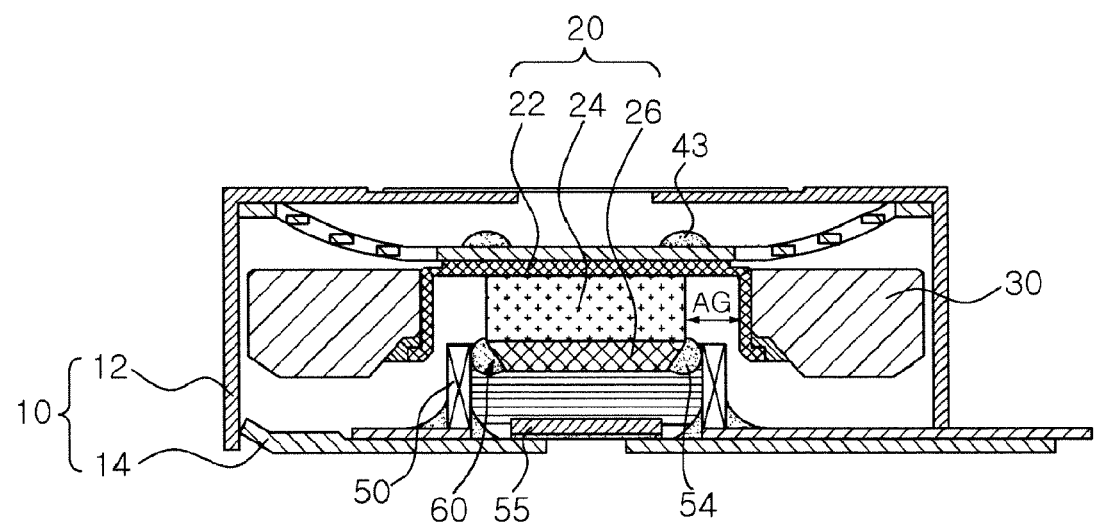
FIG. 2 is a cross-sectional view schematically showing the linear vibrator of FIG. 1.

FIG. 1 is a partially cut-away perspective view schematically showing a linear vibrator according to an exemplary embodiment of the present invention; FIG. 2 is a cross-sectional view schematically showing the linear vibrator of FIG. 1; and FIG. 3 is a perspective view schematically showing an elastic member according to an exemplary embodiment of the present invention.

Figure 3:
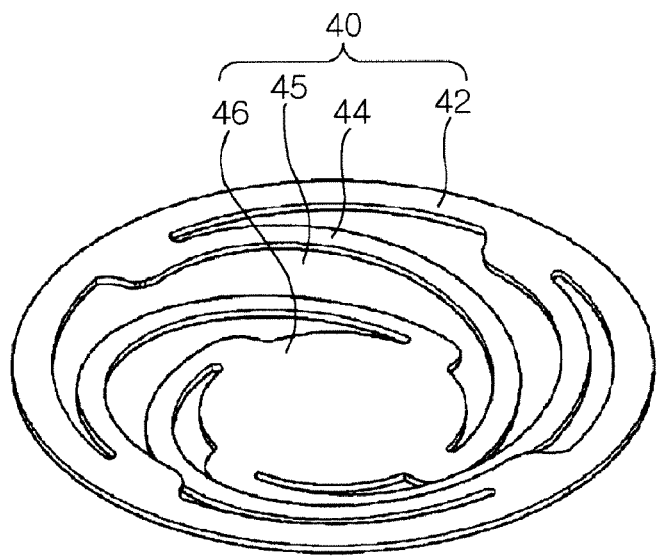
FIG. 3 is a perspective view schematically showing an elastic member according to an exemplary embodiment of the present invention.

Referring to FIGS. 1 through 3, a linear vibrator 1 according to an exemplary embodiment of the present invention may include a housing 10, a magnetic field unit 20, a coil 50, magnetic fluid 54, and a contact avoiding unit 60.

The housing 10 may have an internal space formed therein, wherein the internal space has internal components forming a vibrator disposed therein. The housing 10 may be implemented by various methods, and particularly, should be provided such that the internal components may be easily disposed therein.

The housing 10 according to an exemplary embodiment of the present invention may include a cylindrical upper case 12 of which a lower portion is open and a bracket 14 closing the lower portion of the upper case 12 and having a coil mounted thereon.

The magnetic field unit 20 may generate a magnetic field having a predetermined strength, and may include a yoke 22 and a magnet 24 that are disposed in the internal space of the housing 10. In addition, the magnet 24 may include a yoke plate 26 formed on a surface opposite to a contact surface between the magnet 24 and the yoke 22.

The yoke 22 has a cylindrical shape in which an upper portion thereof is closed and a lower portion thereof is opened, and more specifically, may include a flat part 222 having the magnet 24 mounted thereon, a mass body fixing part 224 formed to be bent from the flat part 222 in a mounting direction of the magnet 24 to fix a mass body 30, and a claw part 226 formed to be bent from the mass body fixing part 224 to support a bottom of the mass body 30.

The magnet 24 may be bonded and fixed to one surface of the yoke 22 using an adhesive.

A diameter of an inner circumferential surface of the yoke 22 is larger than that of an outer circumferential surface of the magnet 24, such that an air gap (AG) having a predetermined size may be formed between the inner circumferential surface of the yoke 22 and the outer circumferential surface of the magnet 24.

The coil 50, allowing current to flow in a magnetic field formed by the magnetic field unit 20 and vibrate the magnetic field unit 20, may be disposed within the air gap (AG).

The coil 50 may have a cylindrical shape so that a space in which the magnetic field unit 20 can move is formed, and the magnetic fluid 54 preventing the contact of the magnetic field unit 20 and the coil 50 may be provided in a clearance therebetween.

The contact avoiding unit 60 is formed by chamfering the yoke plate 26, and a length of a contact surface between the yoke plate 26 and the magnet 24 may be longer than that of a non-contact surface opposite to the contact surface.

Figure 5:
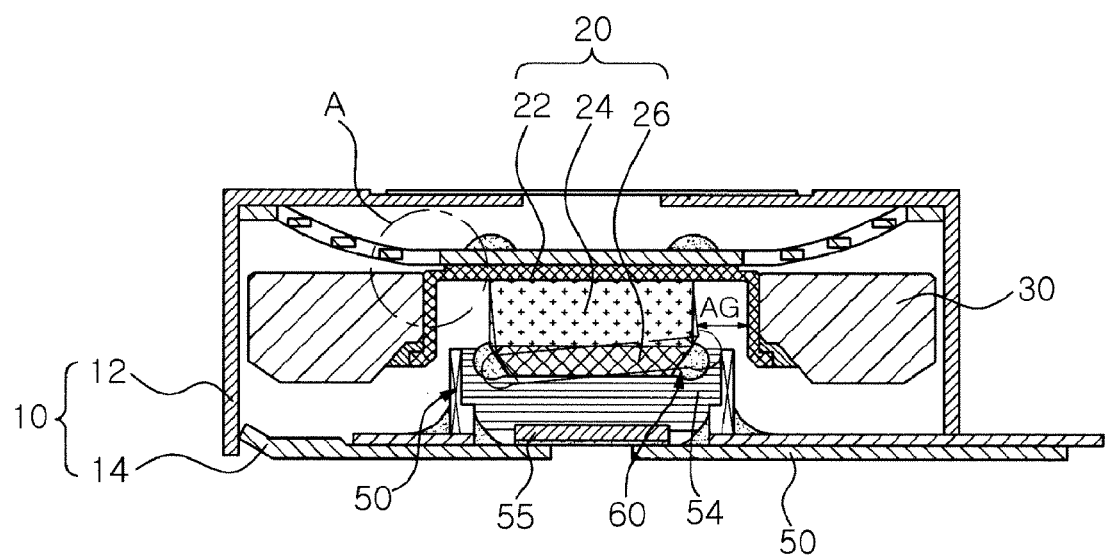
FIG. 5 is a cross-sectional view schematically showing interference between a stator and a vibrator when external impacts are applied to the linear vibrator of FIG. 4.

Accordingly, the yoke plate 26 moves laterally rather than moving within an inner circumferential portion of the coil 50 due to impacts, such that the yoke plate 26 may be prevented from directly contacting the coil 50 (See FIG. 5).

A damper 55 may be formed in an upper surface of the bracket 14 and prevent the magnetic field unit 20 from contacting the housing 10 due to vibration. The damper 55 may be made of a rubber material; however, a material of the damper may be variously changed.

The elastic member 40 may include a housing fixing part 42 fixed to any portion of the upper case 12, a yoke fixing part 46 surface-contacting a surface opposite to the contact surface between the magnet 24 and the yoke 22, and a plurality of connecting strip parts 44 disposed such that an elastic space 45 is formed between the housing fixing part 42 and the yoke fixing part 46.

The housing fixing part 42 is a fixed end of the elastic member 40 fixed to the housing 10 that is not vibrated, and the yoke fixing part 46 is a free end of the elastic member 40 vibrated due to the vibration of the magnetic field unit 20.

The elastic member 40 may be a spring member, the yoke fixing part 46 may have a flat plate shape, the housing fixing part 42 may have an annular rim shape, and the connecting strip parts 44 may have a spiral shape connecting the yoke fixing part 46 and the housing fixing part 42.

Figure 4:
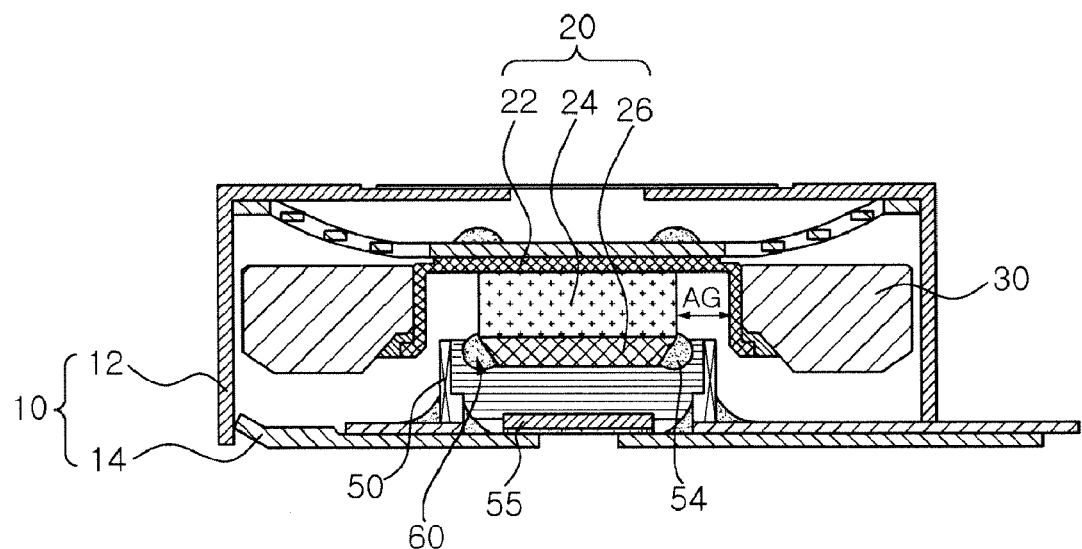
FIG. 4 is a cross-sectional view schematically showing a linear vibrator according to another exemplary embodiment of the present invention.

FIG. 4 is a cross-sectional view schematically showing a linear vibrator according to another exemplary embodiment of the present invention, and FIG. 5 is a cross-sectional view schematically showing interference between a stator and a vibrator when external impacts are applied to the linear vibrator of FIG. 4.

Referring to FIGS. 4 and 5, a basic shape of a linear vibrator is substantially the same as that of the linear vibrator according to an exemplary embodiment of the present invention shown in FIGS. 1 through 3. Therefore, only differences therebetween will be described below.

A contact avoiding unit 60 according to another exemplary embodiment of the present invention is formed such that a movement space of the coil 50 corresponding to the position of the yoke plate 26 is larger than a vibration space, in which the coil 50 is formed at a position corresponding to a lower portion of the yoke plate 26, in a vibration stop state. That is, the coil 50 corresponding to an upper portion of the yoke plate 26 may be wound to be less than the coil 50 corresponding to a lower portion thereof, thereby manufacturing the contact avoiding unit 60.

FIG. 5 shows that the chamfered yoke plate 26 and the contact avoiding unit 60 having a reduced winding amount of the coil 50 are vibrated due to an external impact, such that the yoke plate 25 and the coil 50 contact each other.

Direct contact between the coil 50 and the yoke plate 26 due to the external impacts may be reduced in spite of the internal components being disposed at a high level of density, whereby improved characteristics in terms of noise, durability, and the like are achieved.

As set forth above, according to exemplary embodiments of the present invention, interference between a magnet and an inner diameter of a coil during generation of external impacts may be avoided, whereby the disconnection of the coil may be prevented.

In addition, the generation of noise or damage due to the interference between the magnet and the inner diameter of the coil may be prevented.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear vibrator comprising:
   a housing having an internal space formed therein;
   a magnetic field unit including a yoke disposed in the internal space, a magnet mounted on a surface of the yoke, and a yoke plate formed on a surface opposite to a contact surface between the magnet and the yoke;
   a coil interacting with the magnetic field unit to allow the magnetic field unit to move linearly when power is applied thereto, and forming a movement space for the magnetic field unit;
   magnetic fluid provided in a clearance between the magnetic field unit and the coil and alleviating contact impact between the magnetic field unit and the coil; and
   a contact avoiding unit formed on at least one of the magnetic field unit and the coil and avoiding a contact between the magnetic field unit and the coil due to an external impact.

2. The linear vibrator of claim 1, wherein the contact avoiding unit is formed by chamfering the yoke plate, and a length of the contact surface between the yoke plate and the magnet is longer than that of a non-contact surface opposite to the contact surface.

3. The linear vibrator of claim 1, wherein the housing includes a cylindrical upper case of which a lower portion is open and a bracket closing the lower portion of the upper case and having a coil mounted thereon.

4. The linear vibrator of claim 3, wherein a movement space of the coil corresponding to a position of the yoke plate is larger than a vibration space in which the coil is formed at a position corresponding to a lower portion of the yoke plate in a vibration stop state.

5. The linear vibrator of claim 1, wherein the yoke comprises:
   a flat part having the magnet mounted thereon;
   a mass body fixing part being bent from the flat part in a mounting direction of the magnet to fix a mass body; and
   a claw part being bent from the mass body fixing part to support a bottom of the mass body.

6. The linear vibrator of claim 1, wherein the housing includes a damper formed on a surface thereof, the damper preventing the magnetic field unit from contacting the housing due to vibration.

* * * * *